United States Patent Office 3,537,677
Patented Nov. 3, 1970

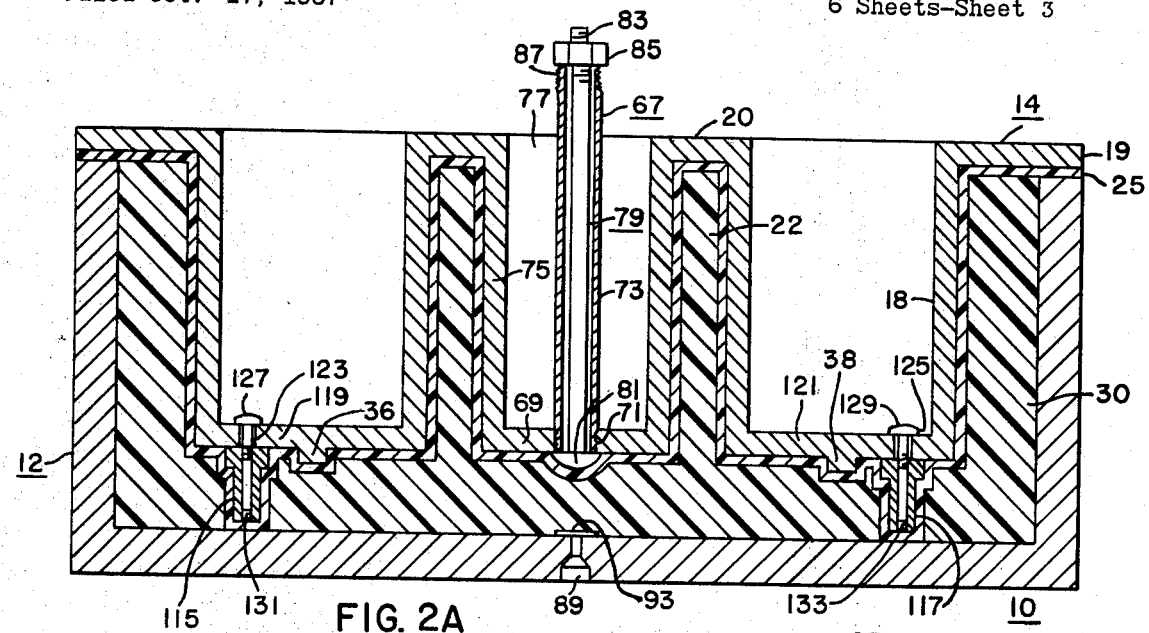
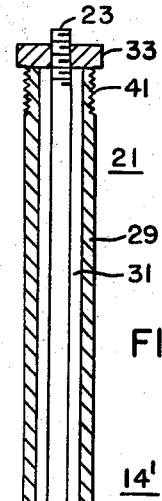
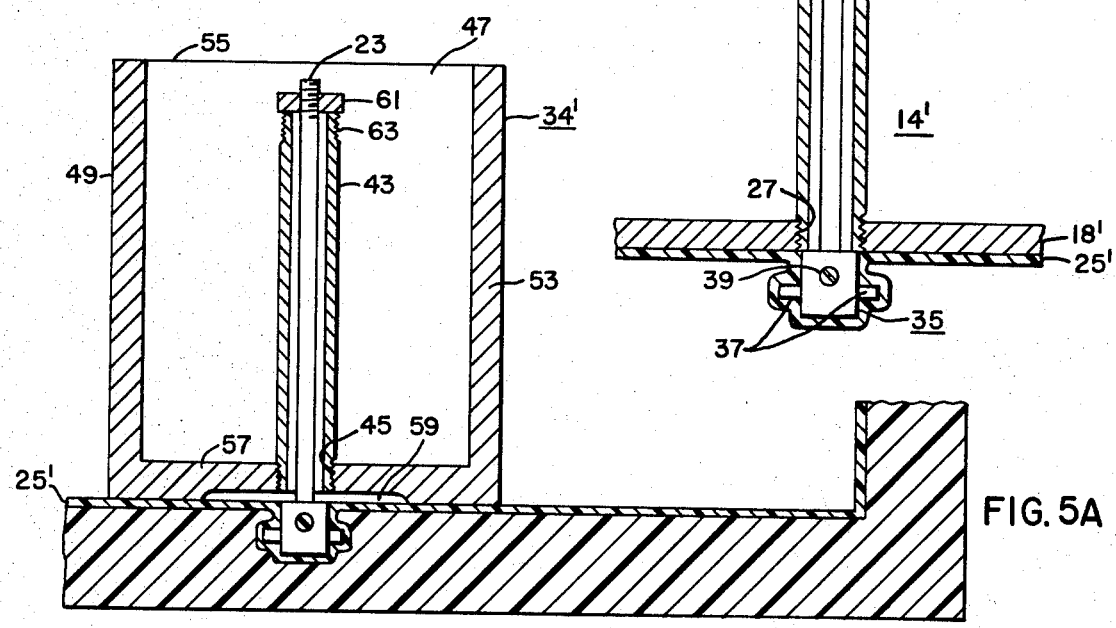

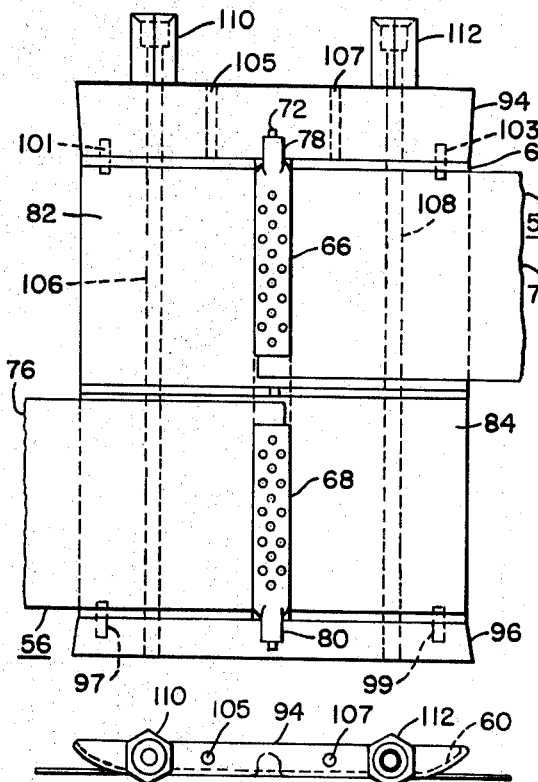
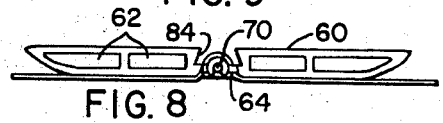
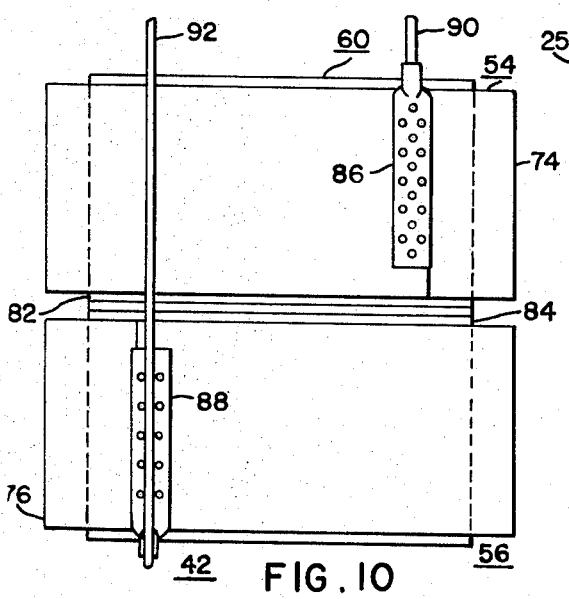
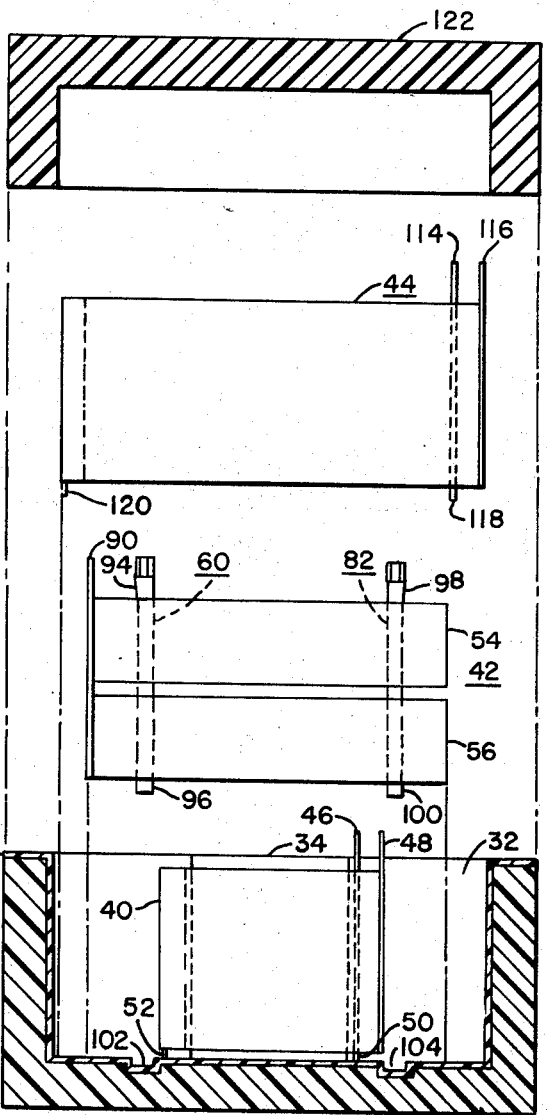

3,537,677
METHODS AND APPARATUS FOR ENCAPSULATING ELECTRICAL WINDINGS
John F. Cotton, Hubbard, Ohio, and Edgar R. Eley, Sharon, and Robert A. Kurz, West Middlesex, Pa., assignors to Westinghouse Electric Corporation, Pittsburgh, Pa., a corporation of Pennsylvania
Filed Oct. 17, 1967, Ser. No. 675,840
Int. Cl. B22d 19/00; B29d 27/04
U.S. Cl. 249—83                                8 Claims

ABSTRACT OF THE DISCLOSURE

A mold formed of an expanded cellular plastic or resin system, such as a rigid polyurethane foam. The foam mold has a resinous coating disposed in the mold cavity which functions as a liner, and also as a noncontaminating mold release means. An upstanding metallic center post is fixed in the mold cavity by a stud having one end embedded in mold.

BACKGROUND OF THE INVENTION

Field of the invention

This invention relates in general to molds suitable for use in encapsulating electrical windings in a cast resin insulation system, and more specifically to molds formed of a foamed resin.

Description of the prior art

Encapsulating methods of the prior art utilize costly and intricate metal molds for containing the electrical apparatus to be encapsulated, and the encapsulating resin system. The metal mold, the electrical apparatus, and the resin system is then heated in an oven to gel the resin system. The mold is then stripped from the encapsulated apparatus, and cleaned for reuse, and the encapsulated apparatus is placed in an oven for the post-cure cycle. The disadvantages of this method become immediately apparent when production quantities of the encapsulated apparatus are to be obtained, requiring a considerable investment in the metallic molds, which would have to be scrapped each time the design of the electrical apparatus is changed. Further, the oven facilities for gelling and curing the cast resin system would have to be quite extensive, because of the relatively long gel and cure times for cast resin systems. Also, the cost associated with the maintenance and cleaning of the mold prior to reuse would be substantial, and there would be handling problems due to the weight of the molds.

It would be desirable to provide new methods and apparatus for encapsulating electrical apparatus in a castable resin system, at high production rates, which would substantially reduce the investment in metal molds, substantially reduce the mold cost when the design of the apparatus is changed, reduce or eliminate the oven facilities required for gelling and curing the cast resin system, eliminate the problems associated with the maintenance and cleaning of a large plurality of metallic molds, and alleviate the handling problem of the metal molds due to their weight.

SUMMARY OF THE INVENTION

Briefly, the present invention solves the problems associated with the prior art encapsulating methods, by providing a casting mold formed of an expanded cellular plastic, such as a polyurethane foam. Any desired number of foam molds may be quickly and inexpensively formed from a single metallic master or pattern mold. The foam molds may utilize a conventional mold release and the foam molds discarded after a single use, or a resinous liner may be incorporated into the foam mold when it is formed, which allows the mold to be reused for a limited number of times, and which also functions as a noncontaminating mold release for the encapsulated windings. To make a design change in the encapsulated windings merely requires that the pattern mold be modified, or a new pattern mold to be fabricated. The foam molds, being excellent thermal insulators, efficiently contain the heat of the poured resin, and by providing an insulating top for the foam mold, the foam mold and top may be used as a container to gel the poured resin system without auxiliary heat. Thus, ovens for gelling the cast resin system are not required. After the resin system has gelled and the encapsulated windings are removed from the foam mold, the assembly may be placed in an oven for the post-cure cycle; or, the encapsulated windings and resin system may be electrically heated by connecting a source of electrical potential to certain of the windings, and by shorting the remaining windings, and the heated encapsulated windings may then be placed in an enclosure formed of a foamed plastic for the cure cycle. The foam molds, being very light, present no handling problems, and there is substantially no maintenance associated with them. They are discarded when they may no longer be efficiently used to encapsulate the electrical windings.

BRIEF DESCRIPTION OF THE DRAWINGS

Further advantages and uses of the invention will become more apparent when considered in view of the following detailed description, in which:

FIG. 2A is a cross-sectional view, similar to the view shown in FIG. 2 except modified to enable compressed air to be used to eject the foam mold from the pattern mold, FIG. 4A is a fragmentary cross-sectional view of the male portion of the pattern mold shown in FIG. 4, taken along the line IV—IV.

FIG. 5A is a fragmentary cross-sectional view of the foam mold shown in FIG. 5, FIG. 6 is an exploded, side-elevational view, partially in section, illustrating a foam mold and electrical windings to be encapsulated therein, FIG. 7 is an end elevational view illustrating the start of electrical windings, and how they may be intercon - FIG. 8 is a plan view of a duct former which may be used with the windings shown in FIG. 7, FIG. 9 is a plan view of the top duct former plug shown in FIG. 7, FIG. 10 is an end-elevational view of the completed windings, of which the start was shown in FIG. 7.

DESCRIPTION OF THE PREFERRED EMBODIMENTS

This invention relates to new and improved methods and apparatus for encapsulating electrical windings, which overcome the disadvantage of prior art methods and apparatus, especially when production quantities are required. In general, the new methods and apparatus involve the fabrication and use of an encapsulating mold formed of an expanded cellular plastic material. Since the new apparatus may conveniently be described while the steps of the new methods are being enumerated, the methods and apparatus which may be used to carry out the methods will be described together.

The first step in the method of encapsulating electrical windings in a mold formed of foamed plastic, is to provide a master or pattern mold for constructing the foam molds. The pattern mold may be used to construct as many foam molds as required to provide the specified production rate, and to replace the foam molds as they are discarded. Thus, there is no large investment to be made in metallic molds. To make changes in the design of the encapsulated winding only requires changes to be made in the pattern mold. Changes in design may be quickly and easily made without requiring changes to be made to a large plurality of metal molds, or requiring the scrapping of a large quantity of metal molds if the design change is a major one.

Figure 1:
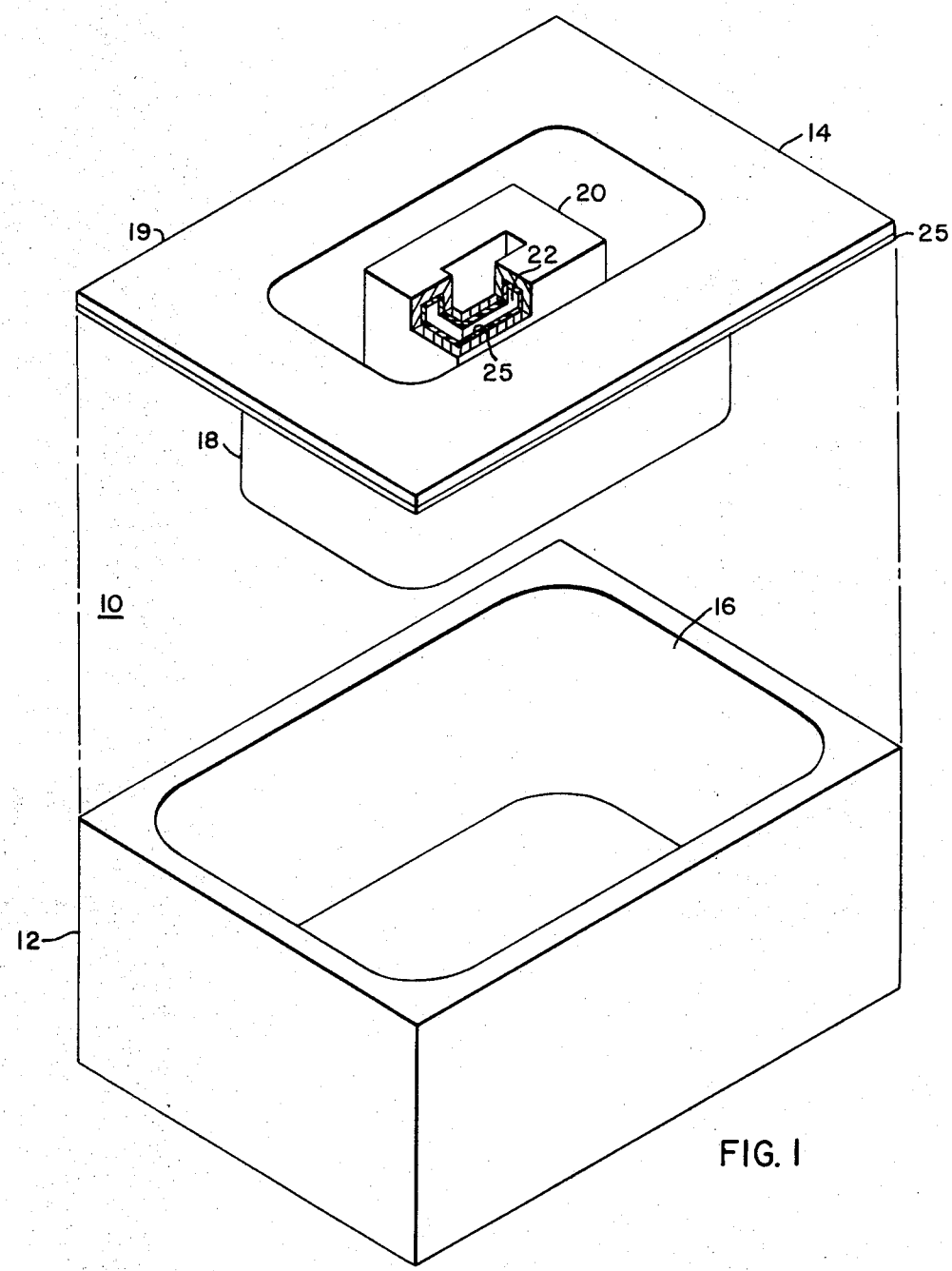
FIG. 1 is a perspective view of a pattern mold which may be used to provide foam molds constructed according to the teachings of the invention.

FIG. 1 is a perspective view of a pattern mold 10 which may be used to carry out the first step of the method. Pattern mold 10 has first and second cooperating portions, a female mold portion 12, and a male mold portion 14. The female pattern mold portion 12, which may be formed of any suitable metal such as steel or aluminum, has a cavity 16 formed therein which forms the outer bottom and outer side wall portions of the foam mold. The male pattern mold portion 14, which also may be formed of a suitable metal such as steel or aluminum, has a projecting portion 18 sized to enter the cavity 16 of portion 12, in predetermined spaced relation with the bottom and side wall portions of the cavity 16, in order to establish the wall thickness of the bottom and side wall portions of the foam mold, and to determine the dimensions of the cavity in the foam mold. The projection 18 is connected at its upper end to a flanged portion 19, which cooperates with the upper surface of portion 12 when portions 12 and 14 are assembled, to seal the cavity of the pattern mold 10. Since the cast winding requires an opening therein for receiving a magnetic core, the foam mold must have a projection rising from the bottom of its cavity, to form this opening. As shown in FIG. 1, this projection may be integrally formed while forming the foam mold within the cavity of the pattern mold 10, by a projection 20 which rises vertically upward from the bottom of projecting portion 18. The projection 20 has an opening accessible from within the cavity of the pattern mold 10, to allow the foamed resin to rise therein and establish the desired shape for the center post or projection 20. Thus, as shown more clearly in FIG. 2, which is a cross section of the pattern mold 10 shown in FIG. 1 with portions 12 and 14 in assembled relation, the projection 20 has a double wall section, with the double wall in this embodiment defining a rectangular cavity 22, and with the cavity 22 in projection 20 being accessible from within the cavity of the pattern mold 10.

To form a foam mold from the pattern mold 10 requires that a suitable foam resin system be mixed and introduced into the cavity 16 of the female portion 12 of the pattern mold 10. The cavity 16 of the female pattern mold portion 12 may have a suitable mold release material uniformly applied to its surfaces, such as polytetrafluoroethylene, commonly called Teflon, and the female pattern mold portion is preheated to a predetermined temperature, which depends upon the particular foam resin system utilized. The male portion 14 of the pattern mold 10 may also have a mold release material on the surfaces which enter the cavity 16, and is also preheated to a predetermined temperature. The resin is mixed, introduced into the heated female portion 12 and the heated male portion 14 is disposed in assembled relation with the female portion. The resin system, as it foams and rises, fills the cavity between the male and female molds, and the cavity 22 in the center of projection 20, forming the foam mold 30 shown in FIGS. 2 and 3. The pattern mold 10, along with the foamed resin, may then be heated to a predetermined elevated temperature for a predetermined period of time, to cure the foam mold, and then the foam mold 30 may be removed from the pattern mold. The foam mold 30 has a cavity 32 and a projection or center post 34 rising from the floor of the cavity, as shown in the perspective view in FIG. 3.

While the foam mold 30 may be used to encapsulate electrical apparatus, by applying a mold release material to its cavity surfaces, the foam mold 30 may be formed according to an embodiment of the invention in which a smooth, tight-fitting plastic liner 25 is disposed in the cavity 32, and on the surfaces of the projection 34.

As shown in FIG. 1, the plastic liner 25 is disposed on at least the surfaces of the male pattern portion 14 which will come into contact with the foamed resin, including the surfaces within the cavity 22 of its center post or projection 20. Liner 25 is preferably formed of a thermoplastic material, having a softening temperature consistent with the pouring temperature of the encapsulating resin, such as polyvinylchloride, polyethylene, or polypropylene. Thermosetting materials would, in general, be unsuitable, as the cast resin system for encapsulating the electrical windings may stick thereto, while a thermoplastic material may be selected which will soften and secrete enough plasticizer to act as a mold release. The liner resin may be applied to the male portion 14 of pattern mold 10 by heating the male portion 14 to a predetermined temperature and dipping it into an appropriate resin system. The resin may be powdered, and applied by fluidized bed coating techniques, or it may be an emulsion; or, it may be sprayed, for example, by electrostatic methods. If dipped, the temperature of the male portion will determine the thickness of the resulting plastic liner.

The plastic liner on the male pattern mold portion 14 will serve as the mold release for the male portion of the pattern mold. Then, when the resin system is foamed in the pattern mold, the foamed resin will adhere tenaciously to the liner 25. The bond between the foam mold and the liner 25 is much stronger than the bond between the liner 25 and the male portion of the pattern mold. Thus, when the foam mold 30 is removed from the pattern mold 10, the liner 25 will also be removed as an inseparable portion of the foam mold 30, and it will be in the desired position on the foam mold 30.

Liner 25 functions as a mold release, aiding in the removal of the foam mold 30 from the male portion of the pattern mold, it functions to provide a smooth coating on the cast resin which is subsequently cast therein, it functions as a noncontaminating mold release for the cast resin system, and it allows the life of the foam mold to be extended. Instead of scrapping the foam mold after a single casting, it may be used to form a plurality of additional cast windings, before it deteriorates to a point which necessitates scrapping.

As hereinbefore stated, the resin of which the foam mold 30 is formed may be any suitable resin which is capable of standing the temperatures at which the casting resin system is poured and cured. In general, it should preferably be a thermosetting, rigid foam of sufficient density to provide the requisite strength. Examples of suitable foamed resin systems are the urethanes, epoxides, phenolics and the silicones.

The rigid, closed-cell polyurethane foams have been found to be excellent as they may be foamed in place, and they provide good adhesion to the plastic liner on the male portion of the pattern mold. They may also be used at the elevated temperatures at which the casting resin system is poured, they are chemical resistant, their density may be easily controlled, and they may be blown with fluorocarbons, which gives them the excellent thermal insulating qualities necessary to use the molds as gelling and curing containers. Rigid polyurethane foams, which are the reaction product of a polyisocyanate and a polyhydroxyl material, may also be blown with carbon dioxide, and produced by a water and isocyanate reaction. Since the foam material per se is not part of the invention, and since suitable plastic foams, their compositions, and the methods for producing them, are well known in the art, such, for example, as disclosed in U.S. Pat. 3,072,582 issued Jan. 8, 1963, and entitled "Polyether-Urethane Foams and Method of Making Same," and in the "Handbook of Foamed Plastics," Rene J. Bender, Editor, Lake Publishing Corporation, Libertyville, Ill., 1965, they will not be described in detail.

An example of successful methods and apparatus for forming foam molds of polyurethane is to construct the male and female pattern molds of aluminum, heat the male portion of the mold to 165° C. and dip it into an emulsion of polyvinylchloride, which coats the male portion of the mold with a plastic liner approximately 1/16 of an inch thick, heat the male mold and liner to 180° C. for 90 minutes to cure the liner, spray a mold release material on the surfaces of the cavity of the female mold, heat the male and female mold portions to 85° C., mix a rigid polyurethane fluorocarbon blown resin system, pour the resin system into the female portion of the pattern mold, and place the male portion of the pattern mold into assembled relation with the female portion, cure the foamed resin at 180° C. for 30 minutes, remove the male portion of the pattern mold from its assembled position, which leaves the polyvinylchloride liner on the foam mold, and remove the foam mold from the female portion of the pattern mold.

Figure 2:
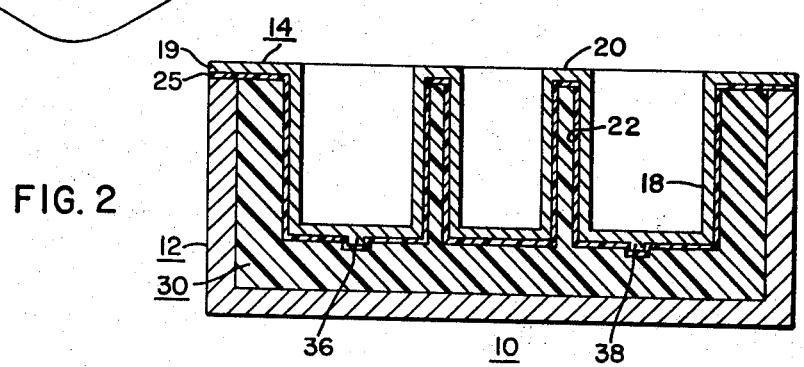
FIG. 2 is a cross-sectional view of the pattern mold of FIG. 1, after a resin system has been foamed therein to form a foam mold.

As shown in FIG. 2, the male portion 14 of the pattern mold 10 may have locating means, such as projections 36 and 38 therein, which form depressions for accurately locating certain of the windings to be encapsulated therein.

The removal of the foam mold 30 from the pattern mold 10 may be facilitated by the strategic application of compressed air. FIG. 2A is a cross-sectional view of the pattern mold 10, with its portions 12 and 14 in assembled relation, and a foam mold 30 shown in the cavity of the pattern mold 10. FIG. 2A is similar to FIG. 2, with like reference numerals indicating like components, except modified according to an embodiment of the invention which utilizes compressed air.

More specifically, the male portion 14 is modified to include a stud, pipe, and nut assembly 67. The center post forming projection 20 of the male portion 14 includes a bottom section 69 which has threaded opening 71 therein. The bottom section 69, along with the inner wall sections of the projection 20, such as wall section 75, define a cavity 77. A tubular member or pipe 73 is disposed within the cavity 77, with one of its ends being threadably inserted into the opening 71, and its other end extending perpendicularly outward from the bottom section 69. A bolt or stud 79, having a flanged head portion 81 and a threaded end portion 83, is inserted, thread end first into the opening 71 and then into the pipe 73. The length of the stud 79 is selected to allow its threaded end 83 to extend past the upper end of the pipe 73, when the flanged head 81 is covering the opening 71, allowing a nut 85 to secure the stud 79 in this position. Assembly 67 is completed prior to the step of applying the liner 25 to the male portion 14, in order to apply the liner over the exposed head portion 81 of the stud 79. The exposed head portion 81 is preferably dome-shaped, in order to facilitate its removal from the liner 25 after the male portion 14 of the pattern mold is removed from its assembled position. Instead of constructing stud 79 to be free of the mold 30, it may also be constructed with a larger end 81 which will enable the stud 79 to be embedded in the foam mold, in a manner which will be hereinafter described relative to another embodiment of the invention. This will then provide a suitable anchoring point for holding down any portion of the electrical apparatus to be encapsulated which would otherwise "float" on the heavier resin system when it is poured.

When the mold 30 is ready for removal from the pattern mold 10, the nut 85 is removed from the end of the stud 79, and a compressed air fitting is coupled to the upper end of pipe 73. The upper end of pipe 73 may be threaded, as shown at 87, to facilitate the connection. Compressed air will be directed between the stud 79 and the pipe 73, the O.D. and I.D. of which were selected to provide an annular space therebetween, past the flanged head 81 of the stud 79, and outwardly between the liner 25 and male portion 14. The compressed air quickly and effectively breaks the bond between the liner 25 and male portion 14, transferring the liner 25 to the foam mold 30.

The foam mold 30 may then be removed from the female mold portion 12 by compressed air. An opening 89 may be disposed through the bottom section of the portion 12, which is sized at the outer access end of the opening to receive the end of a compressed air nozzle. The end of the opening 89 which is within the pattern mold cavity may be temporarily sealed, to enable the foaming process to be performed within the cavity of the pattern mold 10; by gluing a small piece of aluminum foil 93, or other suitable material, over this opening.

The modulus of elasticity of the foam mold 30 allows the compressed air to minutely and nondestructively flex the foam mold to break the bond between itself and the pattern mold 10. The mold 30 may be nondestructively flexed in a mechanical fixture after the electrical apparatus is cast, to break the bond between the cast resin system and the liner 25. Or, as shown in FIG. 2A, the male portion 14 of the pattern mold 10 may be further modified to provide strategically located access ports through the foam mold 30 which will allow compressed air to be used for this function.

More specifically, prior to applying the liner 25 to the male portion 14, tubular metallic members 115 and 117, each having an opening therein which is threaded near each axial end, may be removably secured to the surface of the male portion 14 which will be within the cavity of the pattern mold 10. For example, sections 119 and 121 of the male portion 14 may have openings 123 and 125 disposed therein, which will receive bolts 127 and 129. Bolts 127 and 129 are adapted to threadably engage the internal threads near one end of the tubular metallic members 115 and 117, respectively, securing tubular members 115 and 117 in a depending position from the bottom sections of the male portion 14. Threaded insert members 131 and 133 may be disposed in the remaining ends of the tubular members 115 and 117, in order to seal their openings and prevent entry of liner material therein. Thus, when the liner 25 is applied to the male portion 14, it will also coat the tubular members. When the foam mold 30 has been formed, the bolts 127 and 129 are removed, and the tubular members 115 and 117 will remain in the foam mold 30 when it is removed from the pattern mold 10. The coating of the liner material about the embedded tubular members 115 and 117 will strengthen the bond between the mold 30 and tubular members 115 and 117. Tubular members 115 and 117 are selected to have a length such that the liner 25 on their extreme ends will be visible on the bottom portion of the foam mold when it is removed from the pattern mold 10. This facilitates the location of the tubular members 115 and 117, and the removal of the portion of the liner material, as well as the inserts 131 and 133. The same threads on tubular members 115 and 117 which receive inserts 131 and 133 may be used to accept compressed air fittings. The compressed air is applied to both tubular members simultaneously from a common header, in order to apply a uniform force to both ends of the cast electrical apparatus.

Figure 4:
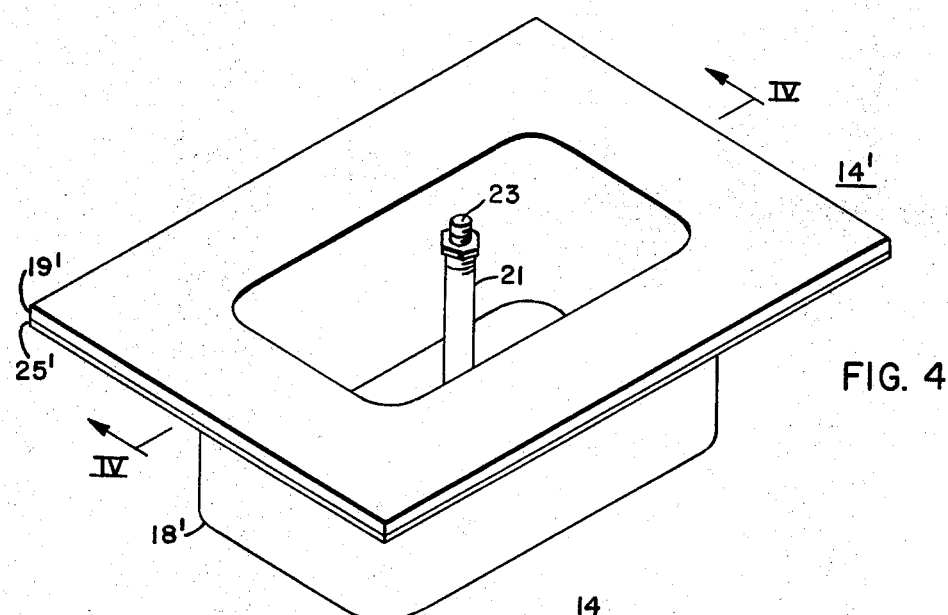
FIG. 4 is a perspective view of a portion of the pattern mold shown in FIG. 1, illustrating a modification which may be made thereto.
Figure 5:
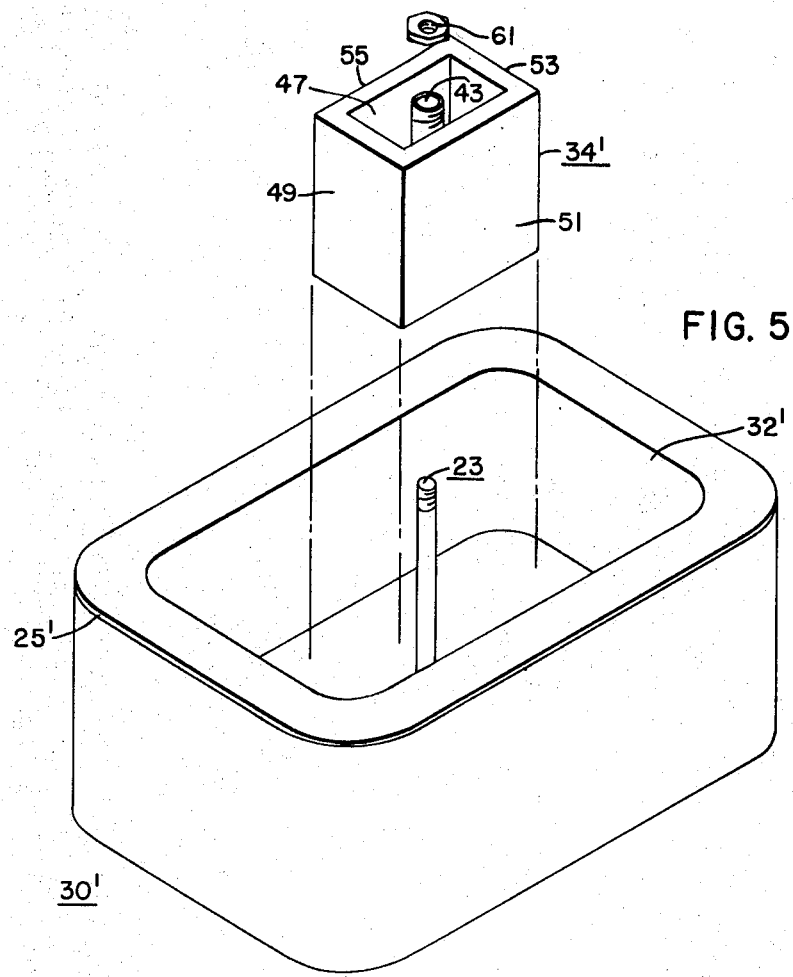
FIG. 5 is a perspective view of a foam mold constructed with the pattern mold of FIG. 1, as modified by the portion of the pattern mold shown in FIG. 4.

Instead of forming the center projection 34 of the foam mold 30 of foam, simultaneously with the formation of the main portion of the mold, the male portion of the pattern mold may be simplified by eliminating projection 20, which would then form a male pattern mold portion 14', as shown in FIG. 4. Pattern mold 14' has a projection 18', flanged portion 19', and a plastic liner 25', similar to the male pattern portion 14, but it is easier to manufacture as it does not have the projection 20. The male pattern mold 14' shown in FIG. 4, cooperating with the female pattern mold portion 12 shown in FIG. 1, will provide a foam mold 30' as shown in FIG. 5, having a cavity 32' lined with a plastic liner 25'. The center post or projection 34', which in this instance may be formed of metal, such as aluminum, is mechanically secured in the desired position within the cavity 32' of the foam mold, such as by a nut and bolt combination 21.

The bolt or stud of the combination 21 may be cast into the foam mold at the time of foaming, by disposing a stud 23 in the male portion 14' of the pattern mold in a manner which will allow it to be transferred to the mold 30', as shown in FIG. 5. This function may be accomplished, as shown in FIGS. 4 and 4A, with FIG. 4A being a fragmentary cross-sectional view of FIG. 4. A threaded opening 27 is provided in the bottom section 18' of the male mold portion 14'. An upstanding tubular member or pipe 29, having a central opening 31, is threaded into opening 27. The stud 23 is then inserted through the opening 31 in the pipe 29, with the stud 23 being of sufficient length to extend past the upper end of the pipe. The upper end of the stud 23 is threaded, and a nut 33 is disposed thereon, to secure the stud 23 to the male portion 14'. The lower end of the stud 23 has a flanged portion 35, which has a larger diameter than the opening in the pipe 29, allowing the nut to draw the flange against the bottom of the male pattern mold portion 14'. The flanged end portion 35 is constructed to extend outwardly from a predetermined distance which will enable it to be deeply embedded in the foam mold 30' when it is formed, and it may have a plurality of projecting portions 37 which will strongly resist any force attempting to pull the stud 23 from the mold 30'.

The stud 23 is placed in assembled relation with male portion 14' prior to applying the liner 25', in order to coat the flanged end 35 with the liner material, which will strengthen the embedment of the stud in the mold. An opening 39 may be provided through the flanged portion 35, which will allow the liner material to enter and provide still additional strength for holding the metallic center post 34' in assembled relation with the foam mold 30'.

Compressed air may also be used in this embodiment of the invention, to aid in the removal of the foam mold from the pattern mold, and also to aid in the removal of the cast electrical apparatus from the foam mold 30'. The nut, bolt, and pipe assembly 21, shown in FIG. 4A, lends itself to providing a suitable access for the compressed air. The I.D. of the pipe 29 and the O.D. of the stud or bolt 23 are selected to provide an annuar air space therebetween. Then, by threading the upper end of pipe 29 at 41, a compressed air fitting may be attached thereto, following the foaming of the mold, and the removal of the nut 33. The compressed air will break the bond between the liner 25' and the male portion 14', facilitating the removal of the male portion 14 from the foam mold 30'. As hereinbefore explained relative to FIG. 2A, compressed air may then be used to break the bond between the female mold portion 12 and the foam mold, by providing a suitable opening through the bottom section of the female portion 12.

When the foam mold 30' is removed from the pattern mold, the stud 23 will be in the upstanding position shown in FIG. 5. The metallic center post 34' may have an upstanding pipe 43 secured thereto, as shown in FIGS. 5 and 5A. FIG. 5A is a fragmentary cross-sectional view of the foam mold 30', shown in FIG. 5, after the center post 34' is in assembled relation with the foam mold 30'.

Center post 34' is substantially rectangular in shape, having a blind opening or cavity 47 therein which is defined by four wall sections 49, 51, 53 and 55, and a bottom section 57. Pipe 43 is disposed within cavity 47, and it has a threaded end which is disposed in a threaded opening 45 in the bottom section 57. Thus, the center post 34' may be placed within the cavity 32' of the mold 30', with the pipe 43 being telescoped over the upstanding stud 23. The threaded upper end of the stud 23 extends past the upper end of the pipe 43, for receiving a nut 61, which is tightened to securely hold the center post 34' in position during the casting step of the process.

Compressed air may also be conveniently used in this embodiment of the invention, to break the bond between the cast electrical apparatus and the liner 25, by providing a slightly concaved surface on the bottom section 57 of the center post 34', to provide a cavity 59 between the bottom section 57 and the liner 25'. Thus, when it is desired to remove the cast electrical apparatus from the foam mold 30', the nut 33 is removed from the end of the stud 23, and compressed air applied between the stud 23 and the pipe 29. The upper end of the pipe 29 may be threaded at 41, in order to secure a compressed air fitting. The compressed air is directed between the I.D. of the pipe 43, and the O.D. of the stud 23, into the cavity 59, and between the cast electrical apparatus and the liner 25'. The compressed air breaks the bond and gently lifts the casting partially from the mold. The center post 34' may be removed from the cast electrical apparatus by a press. In this embodiment of the invention, the center post 34' may be used as an anchor point to hold down any of the electrical apparatus to be encapsulated which would "float" out of position in the resin.

The pipe-stud-nut assembly 21, therefore, may provide the functions of securing the center post 34' in assembled relation with the foam mold 30' it may be used with compressed air to break the bond between the cast electrical apparatus, and the stud 23 may cooperate with a similar pipe and nut to break the bond between the male portion 14' of the pattern mold and the liner 25', at the time the foam mold is formed.

Figure 3:
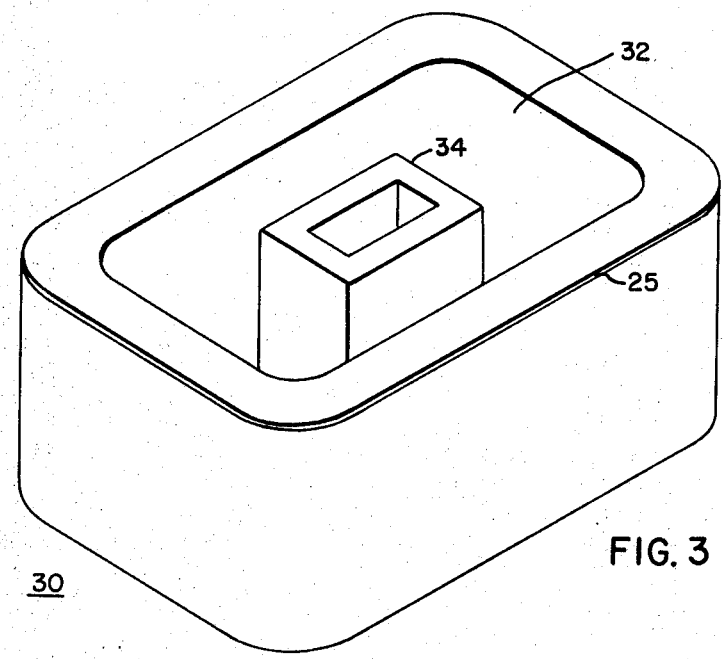
FIG. 3 is a perspective view of a foam mold constructed according to the teachings of the invention.

After the foam mold, such as mold 30 shown in FIG. 3, is formed, the coils or windings to be encapsulated are placed in the desired position within the cavity 32 of the mold, the windings are heated to a predetermined temperatures, the mold and windings are evacuated, and the cast resin system is vacuum poured. The vacuum is retained after pouring for a predetermined period of time to remove as much air from the resin system as possible. An insulating top is then placed on the mold, and the foam mold and top contain the heat of the poured resin system to effect the gelling of the resin. After the resin has gelled, the cast windings are removed from the foam mold, with the liner 25 providing a smooth surface on the cast windings, and also functioning as a non-contaminating mold release agent.

FIG. 6 is an exploded elevational view, partially in section, illustrating electrical apparatus, such as the windings for a transformer, having an inner low voltage winding 40, a high voltage winding 42, and an outer low voltage winding 44. FIG. 6 illustrates how these windings or coils may be telescoped into position about projection 34 within the cavity 32 of the foam mold 30. The foam mold 30 is formed in accordance with the teachings of the invention, having a plastic liner 25 therein, such as shown in FIG. 3.

The inner low voltage winding or coil 40 is formed of a plurality of superposed turns of sheet or foil conductor, such as aluminum or copper, having a coating of enamel insulation on at least one side thereof in order to insulate adjacent turns, or a continuous sheet of insulating material may be disposed between the turns. Terminals 46 and 48 are connected to the ends of winding 40. The center projection 34 of the foam mold 30 locates and positions the inner low voltage winding. Since the cast insulating system should be disposed beneath the windings, one of the terminals, such as terminal 46, may be arranged to extend below the bottom of the coil assembly, to form an extension 50 which supports the terminal end of the winding. A support 52 may be provided for the opposite end of the winding by disposing suitable insulating means, such as polysulfone, between certain turns of the coil as it is being wound. Thus, when the inner low voltage coil 40 is telescoped over the center post or projection 34, the lower extension 50 of terminal 46, and the insulating insert 52, provide supports for holding winding 40 above the bottom of the foam mold.

The high voltage winding 42, in this embodiment of the invention, is formed of first and second serially connected, axially aligned sections 54 and 56. Each coil section is formed of a plurality of turns of electrically conductive foil or strip material, with the strip thickness being less than the thickness of the strip of which the inner low voltage winding was wound. For example, a transformer rated 50 kva., 7200 to 120/240 volts, may have low voltage coils 40 and 44 wound from an aluminum strip 6½ inches wide and .032 inch thick, and the high voltage coil 42 may have its sections wound from an aluminum strip 3 inches wide which is .0025 inch thick.

Since vertical ducts are necessary through the completed cast winding assembly in order to circulate a cooling medium therethrough, to aid in removing the heat from the encapsulated coils, the ducts and high voltage coil sections 54 and 56 may be constructed as shown in FIG. 7, to properly locate and hold the duct former, and to locate and axially position and electrically interconnect the high voltage coil sections 54 and 56.

More specifically, as shown in FIG. 7, a metallic duct former 60, having an end view as shown in FIG. 8, is used to start the inner turns of the high voltage winding sections 54 and 56. Duct former 60 has two major, substantially flat, opposed surfaces separated by a plurality of openings 62 which extend between its ends, and one of its major surfaces has a depression 64 therein which extends between its ends midway between its outer edges. This depression is sized to receive crimp type terminals or connectors 66 and 68. Duct former 60 also contains a slot 70 in the depression 64, sized to allow an electrical conductor, such as a copper wire 72, to be axially threaded therein. The connectors 66 and 68, in addition to being crimped to the ends of the electrically conductive strips 74 and 76, which form coil sections 54 and 56, respectively, are also connected to the ends of wire 72, to electrically connect the two coil sections 54 and 56 in series. The portion of the connectors which slips over the ends of the wire 72, such as portion 78 of connector 66, and portion 80 of connector 68, fits snugly against the ends of the duct former 60, to axially locate the coil sections. Suitable insulating means, such as sheets 82 and 84 of adhesive backed insulating paper may be placed on the duct former 60 to prevent the ends of the first turn of both coil sections from being shorted. The duct former 82, disposed at the opposite side of the high voltage coil sections 54 and 56, as shown in FIG. 6, may also use adhesive backed insulating means to properly start and hold the first turns of the two coil sections in the proper axial relationship. The duct formers, such as duct former 60 shown in FIG. 8, may also have a slot or depression 84 on its other major surface for fixing it to the winding mandrel. Thus, to wind the high voltage coil assembly 42, the duct formers 60 and 82 are slipped into place on the winding mandrel, the adhesive backed insulation is placed in the proper positions on the duct formers, the connectors 66 and 68 are crimped to the ends of the electrically conductive strip material 74 and 76, respectively, the wire 72 is threaded into slot 70 in duct former 60, the ends 78 and 80 of connectors 66 and 68 are slipped over the ends of wire 72 and brazed, soldered, or otherwise suitably connected thereto, and the winding mandrel may be rotated slowly one turn to stick the strips 74 and 76 to the adhesive on the duct former 82, and the mandrel may then be rotated to build up the desired number of turns. When the winding sections 54 and 56 are completed, crimp type terminals 86 and 88 may be connected to the ends of the strip material 74 and 76, respectively, and wires 90 and 92 fastened to the terminals 86 and 88, respectively, as shown in FIG. 10, which is an end elevational view of the completed high voltage winding assembly 42.

In order to prepare the duct formers 60 and 82 for the subsequent casting step, and prevent the casting resin from filling the opening 62 in the duct formers, duct plugs may be placed over the ends of the duct formers, as shown in FIGS. 6, 7 and 9. Duct plugs 94 and 96 may be placed at the top and bottom, respectively, of duct former 60, and duct plugs 98 and 100 may be placed at the top and bottom of duct former 82. The bottom duct plugs 96 and 100, which may have upwardly extending locating pins, such as pins 97 and 99 in plug 96, are used as supports to provide space below the winding section 56 for the cast resin system, and are also used to properly locate the high voltage winding section 42 by fitting into the depressions 102 and 104 in the bottom of the foam mold 30, which were formed by the projections 36 and 38 in the male portion of the pattern mold, as shown in FIG. 2.

The top duct plug, such as plug 94, has downwardly extending locating pins 101 and 103, and air holes 105 and 107 which allow air to be removed from the ducts during the vacuum step of the process.

The top and bottom duct plugs, such as plugs 94 and 96, as shown in FIG. 7, may be interconnected by suitable rods 106 and 108, which extend through the opening 62 in the duct former 60. The rods may be threaded into suitable threaded openings in the boottom plug, and the assembly secured by nuts 110 and 112 which are threaded onto the upper ends of the rods. Nuts 110 and 112 may have suitable transverse openings therethrough to allow them to be used as lifting eyes during the handling of the high voltage winding assembly. The duct plugs have a suitable mold release material applied thereto, to prevent the poured cast resin system from adhering to the plugs.

After the high voltage winding assembly 42 is telescoped into position about the inner low voltage coil 40, and positioned by fitting the lower duct plugs into the depressions in the bottom of the foam mold, the outer low voltage coil 44 is telescoped over the high voltage winding assembly 42. The outer low voltage coil 44 is located by the inside surface of the cavity of the foam mold. The outer low voltage coil 44 may be formed in a manner hereinbefore described relative to the inner low voltage coil 40, having terminals 114 and 116 connected to the ends of the electrically conductive strip material of which the coil is formed, and the supporting means for providing the clearance between the coil and the bottom of the foam mold may be provided by an extension 118 on one of the terminals, such as terminal 114, and by a polysulfone insert 120 at the end of the winding opposite to the terminal end of the winding.

FIG. 6 also illustrates an insulating cover 122 which may be used to cooperate with the foam mold to contain the heat of the poured resin system for gelling the resin system. The insulating cover 122 may be formed of a foamed plastic resin system, similar to the foam mold 30.

Figure 11:
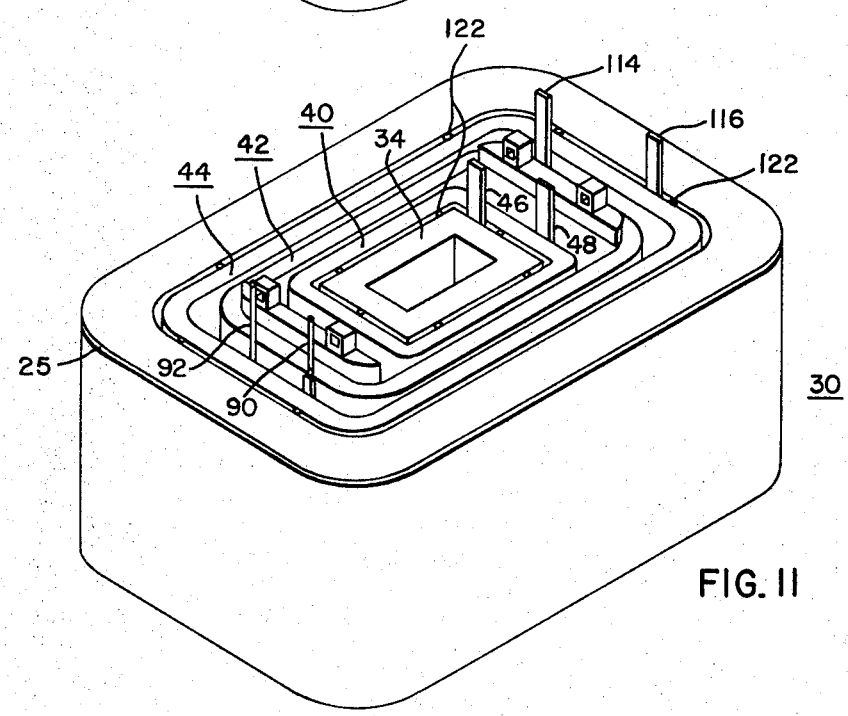
FIG. 11 is a perspective view of transformer windings disposed in the cavity of a foam mold.

FIG. 11 is a perspective view of the foam mold 30, with the inner low voltage coil 40, the high voltage winding assembly 42, and the outer low voltage coil 44 disposed within its cavity, about the center post 34, ready for the casting step of the encapsulating method. In order to provide a thin coating of the cast resin system on the outside turn of the outer low volage coil 44 and on the inside turn of the inner low voltage coil 40, small insulating rods 122, such as glass fiber rods 1/16 inch in diameter, may be placed between the foam mold and the outer low voltage coil 44, and between the center post 34 and the inner low voltage coil 40, at predetermined spaced intervals. These spacer rods may be removed after vacuum casting, or they may be left in place.

After the windings or coils are placed within the foam mold, as shown in FIG. 11, and the spacing rods 122 placed into position, the assembly is ready for vacuum casting. The first step of the casting method is to heat the coils to approximately the same temperature as the cast resin system, for example, 105° C. plus or minus 5° C. for certain epoxy resin systems. This heating step may be accomplished electrically by shorting the terminals of each low voltage coil, and connecting the high voltage winding section to a source of electrical potential. The high voltage coil will be heated resistively, and the low voltage coil will be heated inductively. The mold and heated coils are then placed in a vacuum chamber, where the air is removed, and the cast resin system is then poured at a predetermined elevated temperature, while the mold and coils are held under vacuum. For example, the cast resin system may be poured at a temperature of 105° C. plus or minus 5° C. The vacuum is retained after pouring for a predetermined period of time, and then the mold is removed from the vacuum chamber. Copending application Ser. No. 675,841, filed Oct. 17, 1967, which application is assigned to the same assignee as the present application, discloses a production casting machine and method which may be used to encapsulate the electrical coils in the foam mold disclosed in this application. Any suitable casting resin system may be used, such as the epoxy resin systems disclosed in copending applications Ser. Nos. 447,237, now abandoned, 456,038, now abandoned and 645,320, now U.S. Pat. 3,434,087, filed Apr. 4, 1965, May 6, 1965, and June 12, 1967, respectively, which applications are assigned to the same assignee as the present application.

After the foam mold and its contents are removed from the vacuum chamber, an insulating top 122, as shown in FIG. 6, is placed on the foam mold 30 to contain the heat of the poured resin system. Because of the excellent thermal insulating qualities of the foamed plastic, the cast resin system will gel without any additional heat, allowing the cast coils to be removed from the mold after approximately two hours, as shown in the exploded perspective view of FIG. 12. The foam mold 30 may be used again and again, until it deteriorates to the point where it may no longer be efficiently used as an encapsulating mold.

Figure 12:
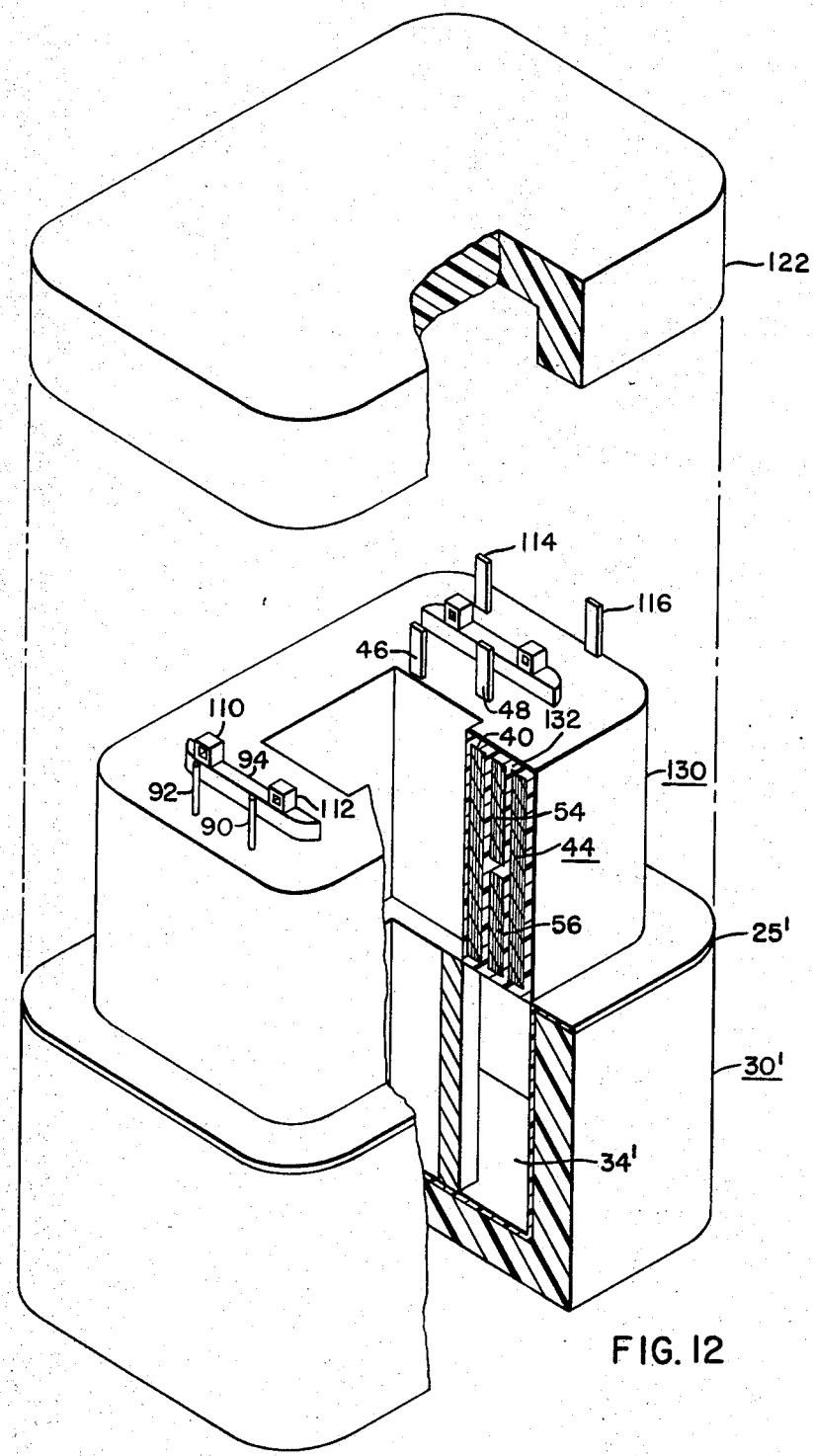
FIG. 12 is an exploded, perspective view, partially in section, illustrating the completed cast winding assembly, the foam mold, and a foam top for the foam mold.

The cast coil or winding assembly 130, shown in FIG. 12, may then be placed in an oven to cure the cast resin system 132, or the cast winding assembly 130 may be again electrically heated, for example to 150° C., by shorting the low voltage coils and applying an electrical potential to the high voltage winding sections, and the heated cast winding assembly may then be placed in an enclosure or box formed of a foamed plastic for the post-cure cycle. The foamed plastic enclosure may be made from the same pattern molds used for forming the foam molds, but in this instance it will not be necessary to provide a liner, or a special master mold may be used to provide the post-cure enclosures, if desired. A typical post-cure time is 6 hours.

In summary, there has been disclosed new and improved methods and apparatus for encapsulating electrical windings in a cast solid electrical insulating material. Disclosed are new methods for forming new encapsulating molds of foamed plastic, as well as new pattern molds for forming the foam molds, which eliminates the necessity of providing a large plurality of metal molds in order to achieve high production rates. Thus, design changes in the apparatus to be encapsulated may be quickly and readily accomplished with little expense, by merely making the necessary changes to the metal pattern mold. The foam molds are inexpensive, they may be used a plurality of times due to the plastic liner, the plastic liner ensures a smooth finish on the cast windings and provides the function of a noncontaminating mold release, and the foam molds eliminate the necessity of utilizing ovens to solidify the cast resin system after pouring. Further, foam boxes or enclosures may be used to provide the post cure, after the cast windings are electrically heated, instead of utilizing post-cure ovens. The foam molds are light, easy to handle, and they eliminate the maintenance associated with metal molds, as they are merely discarded when they will no longer efficiently serve as casting molds. New and improved methods and apparatus are also disclosed which utilize compressed air to facilitate the removal of the foam mold from its pattern, and to facilitate the removal of the cast electrical apparatus from the foam mold.

Since numerous changes may be made in the above-described apparatus and different embodiments of the invention may be made without departing from the spirit thereof, it is intended that all matter contained in the foregoing description or shown in the accompanying drawings, shall be interpreted as illustrative and not in a limiting sense.

We claim as our invention:

1. A foam mold comprising:
   a first member formed of foamed resinous means having bottom and side wall portions which define a cavity therein,
   a metallic insert at least partially coated with solid resinous means, said metallic insert being at least partially embedded in the foamed resinous means of said first member, with the coating of solid resinous means on said metallic insert separating the metallic insert from the foamed resinous means,
   and an adherent liner formed of solid resinous means disposed on at least the surface of said first member which defines the cavity therein,
   the coating of solid resinous means on said metallic insert being an integral continuation of the solid resinous means of said liner.

2. The foam mold of claim 1 including an upstanding member in the cavity of the first member formed of foamed resinous means which is an integral continuation of the foamed resinous means of the first member, and wherein the liner of solid resinous means on the first member is also disposed on at least a portion of said upstanding member.

3. The foam mold of claim 1 including a metallic upstanding member fixed in the cavity of the first member by the metallic insert.

4. The foam mold of claim 1 wherein the foamed resinous means is a rigid thermosetting plastic foam.

5. The foam mold of claim 1 wherein the foamed resinous means is a rigid polyurethane foam.

6. The foam mold of claim 1 wherein the coating of solid resinous means is selected from the group consisting of polyvinylchloride, polyethylene, and polypropylene.

7. The foam mold of claim 1 wherein the coating of solid resinous means is polyvinylchloride and the foamed resinous means is a rigid polyurethane foam.

8. The foam mold of claim 1 wherein the metallic insert is adapted for connection to a supply of compressed air.

References Cited

UNITED STATES PATENTS

| | | | |
|---|---|---|---|
| 1,826,297 | 10/1931 | Apple | 18—36 X |
| 1,845,116 | 1/1932 | Apple | 18—36 X |
| 1,932,391 | 10/1933 | Apple | 18—36 |
| 2,568,128 | 9/1951 | Morris. | |
| 2,944,297 | 7/1960 | Maynard. | |
| 2,986,797 | 6/1961 | Aisenberg | 249—115 |
| 3,046,604 | 7/1962 | Graham et al. | 18—36 |
| 3,222,442 | 12/1965 | Parker et al. | 18—36 X |
| 3,238,286 | 3/1966 | Davis | 18—36 X |
| 3,248,758 | 5/1966 | Schmitz et al. | |
| 3,325,861 | 6/1967 | Pincus et al. | |

J. HOWARD FLINT, JR., Primary Examiner

U.S. Cl. X.R.

264—220, 272; 249—115, 66, 134, 142; 18—2, 5, 36